United States Patent
Bose et al.

(10) Patent No.: US 11,586,928 B2
(45) Date of Patent: Feb. 21, 2023

(54) METHOD AND SYSTEM FOR INCORPORATING REGRESSION INTO STACKED AUTO ENCODER (SAE)

(71) Applicant: Tata Consultancy Services Limited, Mumbai (IN)

(72) Inventors: Tulika Bose, Kolkata (IN); Angshul Majumdar, New Delhi (IN); Tanushyam Chattopadhyay, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 845 days.

(21) Appl. No.: 16/265,906

(22) Filed: Feb. 1, 2019

(65) Prior Publication Data
US 2019/0279090 A1   Sep. 12, 2019

(30) Foreign Application Priority Data
Mar. 9, 2018   (IN) .............................. 201821008854

(51) Int. Cl.
| | | |
|---|---|---|
| G06N 3/04 | (2006.01) | |
| G06N 3/08 | (2006.01) | |
| H04L 45/50 | (2022.01) | |

(52) U.S. Cl.
CPC .............. *G06N 3/084* (2013.01); *G06N 3/04* (2013.01); *G06N 3/0454* (2013.01); *G06N 3/08* (2013.01)

(58) Field of Classification Search
CPC ........ G06N 3/084; G06N 3/04; G06N 3/0454; G06N 3/08
See application file for complete search history.

(56) References Cited

U.S. PATENT DOCUMENTS

| | | | |
|---|---|---|---|
| 11,095,894 B2 * | 8/2021 | Jeon ..................... | H04N 19/184 |
| 2018/0024968 A1 * | 1/2018 | Clinchant ............ | G06N 3/0454 |
| | | | 706/12 |

(Continued)

OTHER PUBLICATIONS

Majumdar, Angshul, and Aditay Tripathi. "Asymmetric stacked autoencoder." 2017 International Joint Conference on Neural Networks (IJCNN). IEEE, 2017. (Year: 2017).*

(Continued)

*Primary Examiner* — Vincent Gonzales
*Assistant Examiner* — Sidney Vincent Bostwick
(74) *Attorney, Agent, or Firm* — Finnegan, Henderson, Farabow, Garrett & Dunner LLP (57) ABSTRACT

A method and system for incorporating regression into a Stacked Auto Encoder utilizing deep learning based regression technique that enables joint learning of parameters for a regression model to train the SAE for a regression problem. The method comprises generating a regression model for the SAE for solving the regression problem, wherein regression model is formulated as a non-convex joint optimization function for an asymmetric SAE. The method further comprises reformulating the non-convex joint optimization function as an Augmented Lagrangian formulation in terms of a plurality of proxy variables and a plurality of hyper parameters. The method comprises splitting the Augmented Lagrangian formulation into sub-problems using Alternating Direction Method of Multipliers and jointly learning parameters for the regression model to train the SAE for the regression problem. The learned weights enable estimating the unknown target values.

6 Claims, 4 Drawing Sheets

(56) References Cited

U.S. PATENT DOCUMENTS

2020/0074277 A1* 3/2020 Jales Costa ............ G06N 3/084
2020/0193299 A1* 6/2020 Geva .................... G06V 10/255

OTHER PUBLICATIONS

Yu W, Zhuang F, He Q, Shi Z. Learning deep representations via extreme learning machines. Neurocomputing. Feb. 3, 2015;149: 308-15. (Year: 2015).*

Hinton, Geoffrey E., and Ruslan R. Salakhutdinov. "Reducing the dimensionality of data with neural networks." science 313.5786 (2006): 504-507. (Year: 2006).*

Zhou, Y. et al. (May 2014). "Is Joint Training Better for Deep Auto-Encoders?," *Machine Learning*; pp. 1-11.

Vincent, P. et al. (Dec. 2010). "Stacked Denoising Autoencoders: Learning Useful Representations in a Deep Network with a Local Denoising Criterion," *Journal of Machine Learning Research,* vol. 11; pp. 3371-3408.

Bao, W. et al. (Jul. 2017). "A deep learning framework for financial time series using stacked autoencoders and long-short term memory," *PLoS ONE*; 18 pages.

\* cited by examiner

METHOD AND SYSTEM FOR INCORPORATING REGRESSION INTO STACKED AUTO ENCODER (SAE)

PRIORITY CLAIM

This U.S. patent application claims priority under 35 U.S.C. § 119 to: India Application No. 201821008854, filed on Mar. 09, 2018. The entire contents of the aforementioned application are incorporated herein by reference.

TECHNICAL FIELD

The embodiments herein generally relates, in general, to robotics and automation and, in particular, to a METHOD AND SYSTEM FOR INCORPORATING REGRESSION INTO STACKED AUTO ENCODER (SAE)

BACKGROUND

Regression analysis is a statistical technique utilized for estimation or prediction purposes. Regression analysis enables estimation or prediction of dependent variables or output parameters using independent variables or input parameters by modelling unknown relationship between the dependent variables and the independent variables. Regression analysis has applications in plurality of fields; right from monitoring and control of units in industrial plant or machine automation to management processes, wherein regression analysis helps in predictive analytics, process optimization, error corrections and the like.

There exist several regression models, such as linear regression, Generalised Linear Models (GLM), quasi-likelihood estimation, Least Absolute Shrinkage and Selection Operator (LASSO), non-parametric Nadaraya-Watson kernel estimator, Support Vector Regression (SVR) and the like. Linear regression models have been explored in the intelligent manufacturing domain for various problems like spindle load estimation, error compensation and the like. However, linear regression models such as Ridge, LASSO and the like cannot handle non-linearity between input and output (target). Non-linear regression techniques, especially the SVR with polynomial kernels and Gaussian kernels, have been used widely in machine automation use-cases. SVRs with these kernels have been applied for tool condition assessment in CNC machine, assessment of machine degradation and the like. Types of non-linearity handled by the kernel trick like those in the SVR with polynomial and Gaussian kernels, are limited and user dependent. They cannot handle arbitrary relation between the input and the target output. Artificial Neural Networks (ANN) are also utilized for regression analysis for load estimation, tool wear prediction and the like. Auto Encoders (AEs), which are self-supervised neural networks with same inputs and outputs, have the capability to learn the non-linearity without requiring specification from the user. Thus, AEs can handle arbitrary non-linear relationships automatically. The input data (X formed by stacking the training samples as columns of a matrix) is projected onto the hidden representation: $H=\varphi(W_E X)$ by an encoder $W_E$; wherein a non-linear activation function $\varphi$ is associated with it. The decoder $W_D$ reverse maps the representation onto the output (=input) as $X=W_D H$. During training, the encoder and the decoder are learnt by minimizing a Euclidean cost function, given by equation:

$$\underset{W_E, W_D}{\mathrm{argmin}} \|X - W_D \varphi(W_E X)\|_F^2$$

These AEs are nested one inside the other to form Stacked Auto Encoders. However, regression is not natively supported with AEs. The regression may be incorporated in the SAE utilizing existing methods of SAE training. However, with the existing training methods for SAEs, it is extremely difficult to learn all parameters of the SAE at one go using backpropagation techniques owing to a vanishing gradient problem. Therefore, currently, the SAE training is solved greedily one layer at a time starting from the outermost layer. However, greedy learning is a sub-optimal approach since the outer layers influence the inner layers but not vice versa. Thus, training the SAEs for regression with efficient training techniques is an open problem.

SUMMARY

Embodiments of the present disclosure present technological improvements as solutions to one or more of the above-mentioned technical problems recognized by the inventors in conventional systems. For example, in one embodiment, a method for incorporating regression into a Stacked Auto Encoder (SAE) is provided. The method comprises generating a regression model for the SAE for solving a regression problem by formulating the regression model as a non-convex joint optimization function. The non-convex joint optimization function comprises a first set of training values associated with a set of input variables applied at an input encoder layer among a plurality of encoder layers of the SAE, a second set of training values for a set of output variables, a plurality of encoder weight matrices associated with the plurality of encoder layers, a decoder weight matrix associated with a decoder layer of the SAE, a regression weight vector associated with the set of output variables, a parameter for controlling weightage of a regression term in the non-convex joint optimization function and a non-linear activation function. The associated weights that need to be learned during training by minimizing this joint optimization function are learned by reformulating the non-convex joint optimization function as an Augmented Lagrangian formulation in terms of a plurality of proxy variables and a plurality of hyper parameters. The plurality of proxy variables provide representations of the set of input variables at each encoder layer among the plurality of encoder layers of the SAE. Further, the method comprises splitting the Augmented Lagrangian formulation into a set of derived functions using Alternating Direction Method of Multipliers (ADMM), wherein the derived functions are sub-problems of the Augmented Lagrangian formulation. Furthermore, the method comprises learning values of the plurality of encoder weight matrices, the decoder weight matrix, the regression weight vector and the plurality of proxy variables for the regression model to train the SAE for the regression problem by obtaining argument minimum of each derived function among the set of derived functions in multiple iterations. Furthermore, the method comprises applying, a set of test values associated with the set of input variables to an output SAE function of the SAE to estimate a set of values for the output variables, wherein the output variables are unknown, wherein the output SAE function comprises the learned values of the plurality of encoder weight matrices and the regression weight vector.

In another aspect, a Stacked Auto Encoder (SAE) system for incorporating regression into a Stacked Auto Encoder (SAE) is provided. The system comprises a processor, an Input output interface, a memory, wherein the memory comprises the SAE and a repository. The SAE is configured to generate a regression model for the SAE for solving a regression problem by formulating the regression model as a non-convex joint optimization function comprising a first set of training values associated with a set of input variables applied at an input encoder layer among a plurality of encoder layers of the SAE, a second set of training values for a set of output variables, a plurality of encoder weight matrices associated with the plurality of encoder layers, a decoder weight matrix associated with a decoder layer of the SAE, a regression weight vector associated with the set of output variables, a parameter for controlling weightage of a regression term in the non-convex joint optimization function and a non-linear activation function. The associated weights that need to be learned during training by minimizing this joint optimization function are learned by reformulating the non-convex joint optimization function as an Augmented Lagrangian formulation in terms of a plurality of proxy variables and a plurality of hyper parameters. The plurality of proxy variables provide representations of the set of input variables at each encoder layer among the plurality of encoder layers of the SAE. Further, the SAE is configured to split the reformulated Augmented Lagrangian formulation into a set of derived functions using Alternating Direction Method of Multipliers (ADMM), wherein the derived functions are sub-problems of the Augmented Lagrangian formulation. Furthermore, the SAE is configured to learn values of the plurality of encoder weight matrices, the decoder weight matrix, the regression weight vector and values of the plurality of proxy variables for the regression model to train the SAE for the regression problem by obtaining argument minimum of each derived function among the set of derived functions in multiple iterations. Furthermore, the SAE is configured to apply, a set of test values associated with the set of input variables to an output SAE function of the SAE to estimate a set of values for the output variables, wherein the output variables are unknown, wherein the output SAE function comprises the learned values of the plurality of encoder weight matrices and the regression weight vector.

In yet another aspect, a non-transitory computer readable medium is provided. The non-transitory computer-readable medium stores instructions which, when executed by a hardware processor, cause the hardware processor to perform acts comprising generating a regression model for the SAE for solving a regression problem by formulating the regression model as a non-convex joint optimization function comprising a first set of training values associated with a set of input variables applied at an input encoder layer among a plurality of encoder layers of the SAE, a second set of training values for a set of output variables, a plurality of encoder weight matrices associated with the plurality of encoder layers, a decoder weight matrix associated with a decoder layer of the SAE, a regression weight vector associated the set of output variables, a parameter for controlling weightage of a regression term in the non-convex joint optimization function and a non-linear activation function. The associated weights that need to be learned during training by minimizing this joint optimization function are learned by reformulating the non-convex joint optimization function as an Augmented Lagrangian formulation in terms of a plurality of proxy variables and a plurality of hyper parameters. The plurality of proxy variables provide representations of the set of input variables at each encoder layer among the plurality of encoder layers of the SAE. Further, the acts comprise splitting the Augmented Lagrangian formulation function into a set of derived functions using Alternating Direction Method of Multipliers (ADMM), wherein the derived functions are sub-problems of the Augmented Lagrangian formulation. Furthermore, the acts comprise learning values of the plurality of encoder weight matrices, the decoder weight matrix, the regression weight vector and values of the plurality of proxy variables for the regression model to train the SAE for the regression problem by obtaining argument minimum of each derived function among the set of derived functions in multiple iterations. Furthermore, the actions include applying, a set of test values associated with the set of input variables to an output SAE function of the SAE to estimate a set of values for the output variables, wherein the output variables are unknown, wherein the output SAE function comprises the learned values of the plurality of encoder weight matrices and the regression weight vector.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and a system for incorporating regression into Stacked Auto Encoder (SAE). The method comprises a training phase and a testing phase. The training phase comprises generating a regression model for the SAE for solving a regression problem. The regression model is formulated as a non-convex joint optimization function (alternatively referred as joint optimization function). The proposed non-convex joint optimization function incorporates regression and modifies an existing Euclidean cost function of the Stacked Auto Encoder framework. The existing Euclidean cost function for the Stacked Auto Encoder comprises a set of training values associated with a set of input variables applied at an input encoder layer among a plurality of encoder layers of the SAE, a plurality of encoder weight matrices associated with the plurality of encoder layers, one or more decoder weight matrices associated with one or more decoder layers of the SAE and a non-linear activation function associated with the layers of the SAE.

The modifications to the existing Euclidean cost function as provided in the joint optimization function include adding a set of training values for a set of output variables, a regression weight vector associated with the set of output variables and a parameter for controlling weightage of a regression term in the non-convex joint optimization function. Further, the modifications includes reducing number of decoder layers to a single decoder layer, which represents an asymmetric SAE. Incorporating the set of output variables and the regression weight vector to the existing Euclidean function enables joint learning, wherein weights of the plurality of encoder weight matrices, the decoder weight matrix and the regression weight vector associated with the output variables are learned simultaneously in a mathematically more optimal manner, unlike existing layer wise pre-training and fine tuning approach.

The proposed non-convex joint optimization function, representing the regression model is minimized to learn values of the regression weight vector, values of the plurality of encoder weight matrices and values of the decoder weight matrix. Thus, all layers including the plurality of encoder layers, the decoder layer and the regression weight vector are learnt jointly. Since, the method includes learning all the layers jointly, the decoders do not play any direct role in the analysis, unlike layer-wise pre-training in the traditional approach. Also, more decoders require more parameters to learn, which leads to over-fitting with limited training data. Therefore, the joint learning of multiple layers of SAE, as proposed by the method, enables using the asymmetric SAE, where a SAE architecture is built on top of an asymmetric model having multiple encoders but a single decoder. The method is explained with reference to an asymmetric SAE comprising the plurality of encoder layers and the single decoder layer. The asymmetric structure of the SAE, as utilized herein by the method, keeps the robust abstraction capacity of deep learning without the pitfalls of over-fitting. Even though the method is explained in conjunction with the asymmetric SAE, which provides an added advantage by reducing number of parameters to be computed, it is understood for a person skilled in the art that the method can be applied to symmetric SAEs with minor modifications and still being within the scope of the invention.

The minimization of the joint optimization function comprises reformulating joint optimization function as an Augmented Lagrangian formulation in terms of a plurality of proxy variables and a plurality of hyper parameters. Further, the minimization comprises breaking the Augmented Lagrangian formulation is into a set of derived functions using Alternating Direction Method of Multipliers (ADMM). The derived functions are sub-problems of the Augmented Lagrangian formulation. Furthermore, argument minimum of each derived function is obtained, during which the values of the plurality of encoder weight matrices, the decoder weight matrix, and the regression weight vector are learned to train the SAE for the regression problem. This completes the training phase. Upon training the SAE to generate the regression model, the testing phase of the method comprises applying, in real time, a set of test values associated with the set of input variables to an output SAE function to estimate a set of values of the unknown output variables. The output SAE function comprises the learned values of the plurality of encoder weight matrices and the learned regression weight vector.

The proposed method provides a generic solution for any regression problem in all domains or application areas. The method is explained with an example application, wherein the regression analysis as proposed is applied in machine automation use cases. A typical use case described herein is for load estimation of a Computer Numerical Control (CNC) machine using the SAE based regression. However, the proposed method can be applied in plurality of domains where the problem to be solved can be formulated as the regression problem. For example, prediction of household electricity consumption can be formulated as an electricity consumption regression problem using known regression techniques. Once the regression problem is identified, the proposed method can represent the regression problem as the non-convex joint optimization function and further solve the non-convex joint optimization function using the method steps proposed. Examples from other domains include blood pressure estimation using photo plethysmography (PPG) and electrocardiography (ECG) signals and the like that can be formulated as regression problems.

Figure 1:
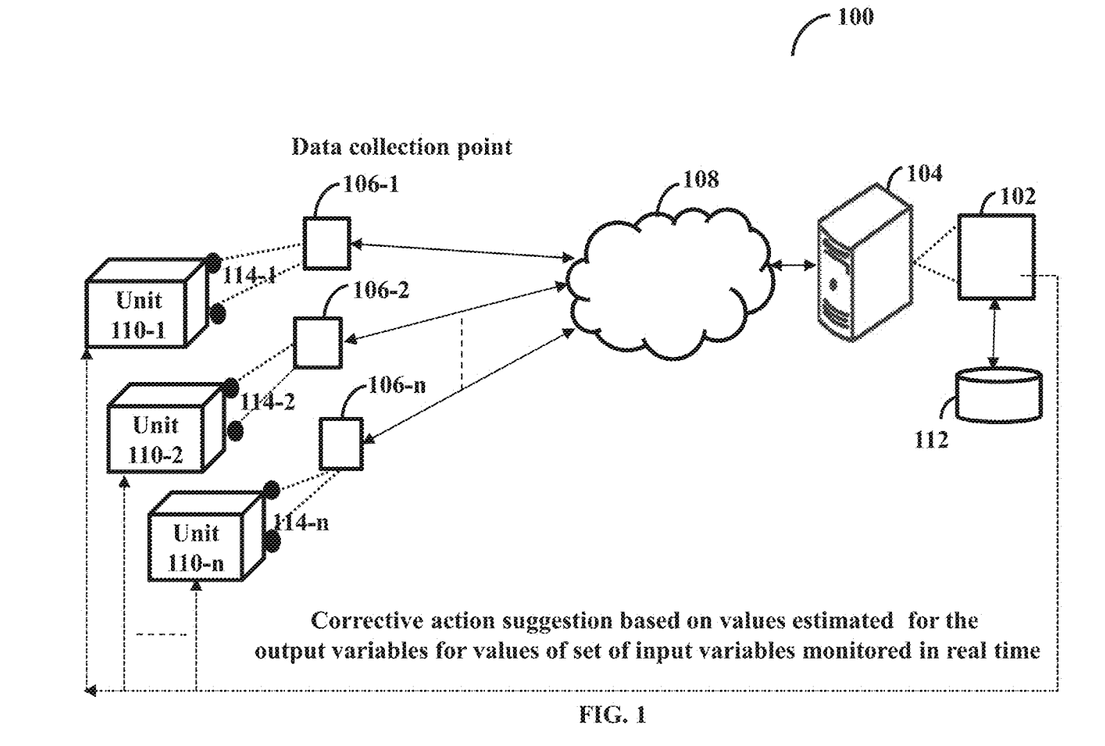
FIG. 1 illustrates an example system implementing a Stacked Auto Encoder (SAE) system that incorporates regression into a SAE for solving a regression problem, according to some embodiments of the present disclosure.
Figure 2A:
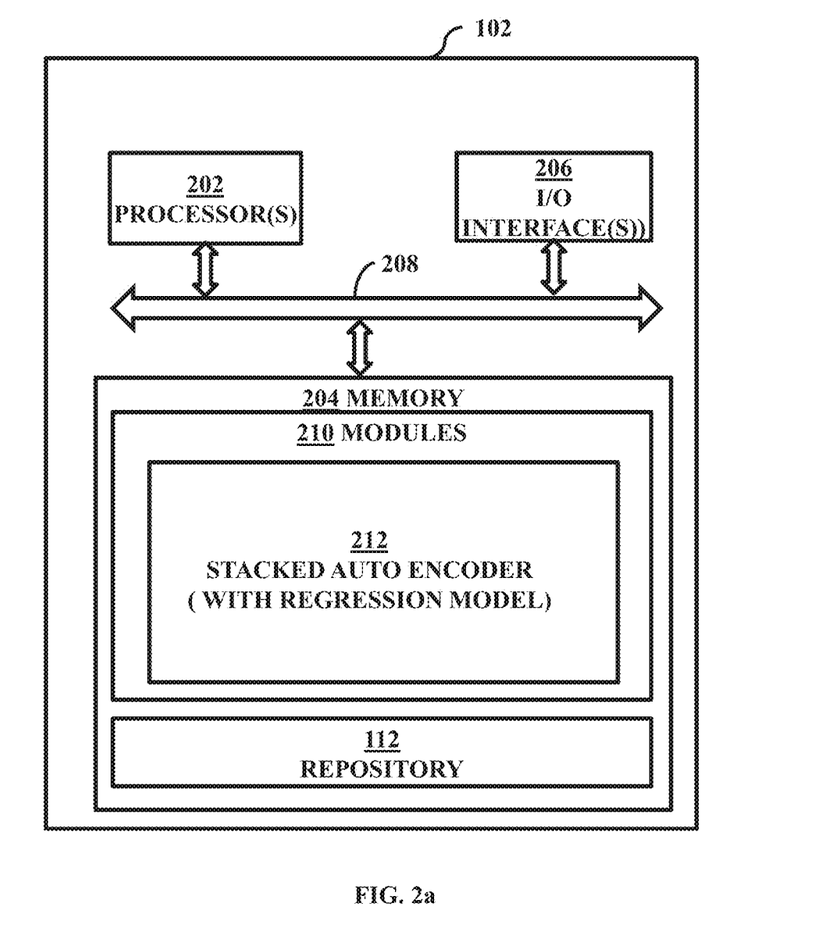
FIG. 2a illustrates a functional block diagram of the SAE system of FIG. 1, according to some embodiments of the present disclosure.
Figure 2B:
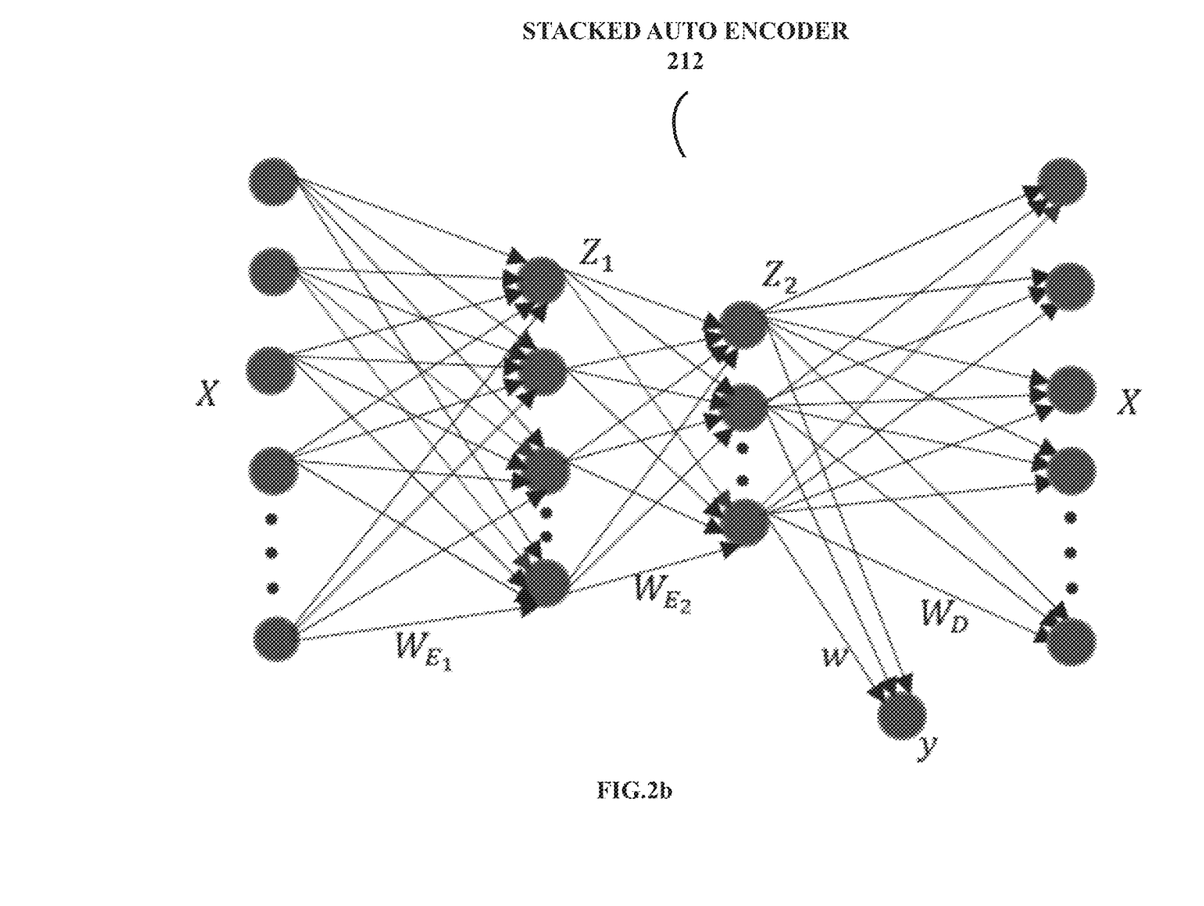
FIG. 2b illustrates architecture of an example SAE with an asymmetric SAE for the regression, according to some embodiments of the present disclosure.
Figure 3:
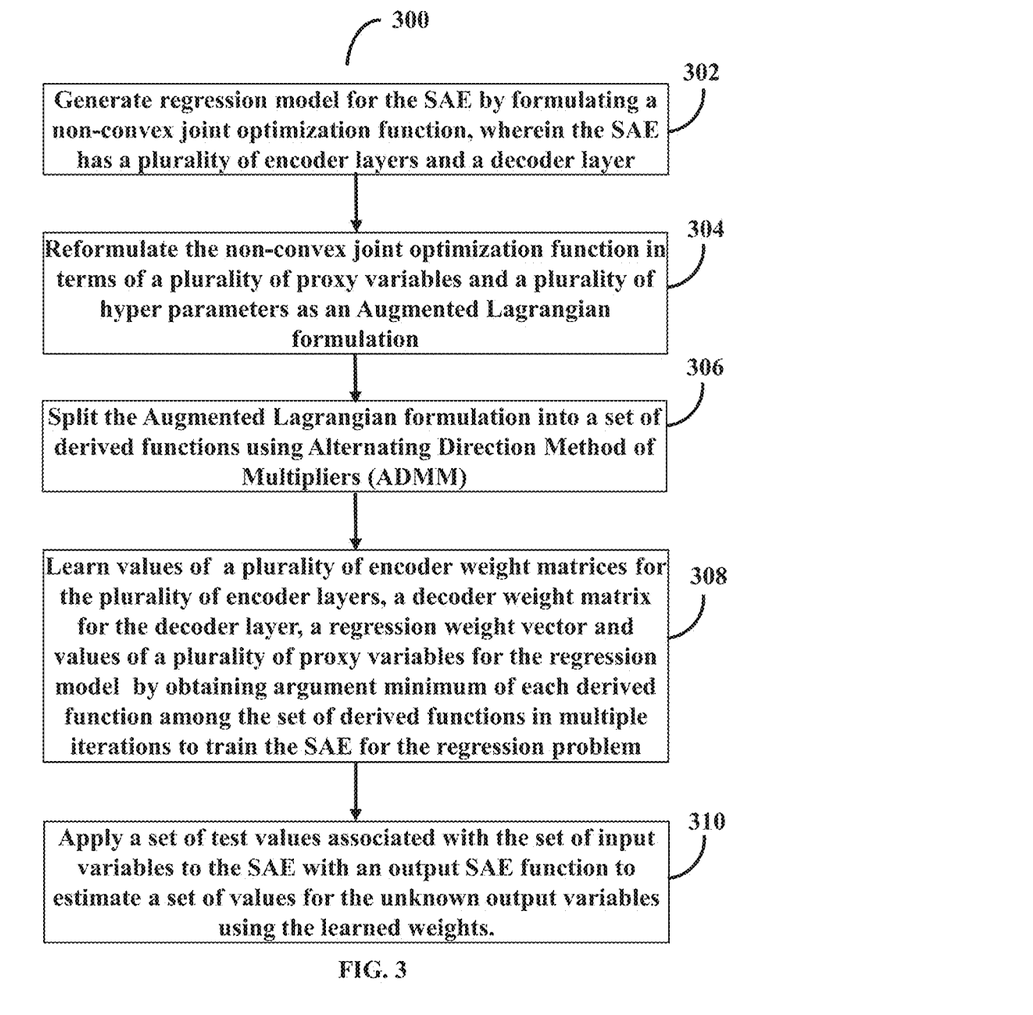
FIG. 3 is a flow diagram illustrating a method for incorporating regression into the SAE for solving the regression problem, in accordance with some embodiments of the present disclosure.

Referring now to the drawings, and more particularly to FIGS. 1 through FIG. 3, where similar reference characters denote corresponding features consistently throughout the figures, there are shown preferred embodiments and these embodiments are described in the context of the following exemplary system and/or method.

FIG. 1 illustrates an example system 100 implementing a Stacked Auto Encoder (SAE) system 102 that incorporates regression into a SAE for solving a regression problem, according to some embodiments of the present disclosure. The system 100 depicts one or more data sources 106-1 through 106-n that are source of data required by the SAE system 102. In an embodiment, one or more data sources among the data sources 106-1 through 106-n collect data of interest that serve as the input variables for the SAE system 102 to solve the regression problem for which a regression model is generated by the SAE system 102. The data of interest may include training values received in training phase by the SAE 102 or test values received during testing phase (real time monitored data or offline data) by the SAE. Each data source such as 106-1 collects multiple sensor readings combined together, which may be obtained from a set of sensors, such as a sensor set 114-1 monitoring the CNC machine unit 110-1. Similarly, the data source 106-2 collects multiple sensor readings for CNC machine (unit 110-2) through a sensor set 114-2. Thus, each data source 106-1 through 106-n is associated with the sensor set 114-1 through 114-n respectively.

An example environment, wherein the system 100 may be implemented may be in intelligent manufacturing domain that has been automated to a great extent with the introduction of Computer Numerical Control (CNC) machines. Computation of outputs (values of output variables) such as load estimation from inputs (values of input variables) such as data from sensor signals or sensor data collected through the data sources (106-1 through 106-n) holds significance in the field of intelligent manufacturing. The SAE system 102 can be configured to estimate output variables such as an axial load and a spindle load values of units 110-1, 110-2 through 110-n (for example multiple CNC machines) in a manufacturing plant from input sensor readings providing spindle speed, feed rate, tool positions and the like obtained from the sensors installed for monitoring the CNC machines (here unit 110-1 through 110-n) via the data sources 106-1 through 106-n. Estimation of the load on the CNC machine from input sensor readings can be viewed as a standard regression problem. Thus, the SAE system 102 is configured to generate the regression model for the defined regression problem (for example herein, axial load and spindle load estimation). The SAE system 102 is configured to utilize the proposed deep learning based regression technique that incorporates regression within the SAE. Unlike the popular heuristic that utilize pre-training and fine-tuning approach, the SAE is configured to generate the regression model defined by the joint optimization function. For units 110-1 through 110-n representing, for example herein, different CNC machines, each such unit has its separate training phase, wherein a separate trained model is generated for each CNC machine. Sensor values from each CNC machine are fed to the respective SAE of the SAE system 102 for obtaining respective trained models during training phase or values of unknown load during the testing phase, wherein different CNC machines may have different characteristics and behavior. The SAE system 102 and generation of the regression model is explained in conjunction with FIG. 2a, FIG. 2b and FIG. 3. The computed values of output variables enable either predicting the future load values or estimating the current load incurred across the axes and spindle. Thus, upon computation of the unknown output variables (axis load and spindle load) by the corresponding regression model of the SAE for each CNC machine (unit 110-1 through 110-n) from the set of input variables (spindle speed, feed rate, tool positions), which are being monitored for each CNC machine (unit 110-1 through 110-n) through the set of sensors 114-1 through 114-n respectively, corrective actions such as change of tools of the CNC machines (units 110-1 or 110-2) may be performed by a system controller.

The data of interest, also referred as data streams, from the data sources 106-1 through 106-n may be transferred to a computing device 104 through a network 108, wherein the computing device 104 may include the SAE system 102. In an example embodiment, the SAE system 102 may be embodied in the computing device 104 (not shown). In example embodiment the SAE system 102 may be in direct communication with the computing device 104, as depicted in FIG. 1.

The collected data from data sources 106-1 through 106-n as well as the regression models generated for each CNC machine by the SAE system 102 can be stored in a repository 112. In an embodiment, the data sources 106-1 through 106-n may be directly connected to the SAE system 102. In an embodiment, the network 108, transmitting data streams from the data sources 106-1 through 106-n to the computing device 104, may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the SAE system 102 through communication links.

In an embodiment, the computing device 104, which implements the SAE system 102 can be a workstation, a mainframe computer, a general purpose server, a network server or the like. Further, the repository 112, coupled to the SAE system 102 may also store other data such as the intermediate data generated during estimation of the output variables during testing phase and weights generated during training phase of the SAE system 102.

In an alternate embodiment, the data repository 112 may be internal to the SAE system 102 (as depicted in FIG. 2a). The components or modules and functionalities of SAE system 102 with an example SAE architecture are described further in detail in conjunction with FIG. 2a and FIG. 2b respectively.

FIG. 2a illustrates a functional block diagram of the SAE system 102 of FIG. 1, according to some embodiments of the present disclosure and FIG. 2b illustrates architecture of an example SAE for the SAE system 102 with an asymmetric SAE for the regression, according to some embodiments of the present disclosure.

The SAE system 102 includes or is otherwise in communication with one or more hardware processors such as a processor(s) 202, at least one memory such as a memory 204, and an I/O interface 206. The processor 202 (hardware processor), the memory 204, and the I/O interface(s) 206 may be coupled by a system bus such as a system bus 208 or a similar mechanism. The memory 204 further may include modules 210.

In an embodiment, the modules 210 include a SAE 212 and other modules (not shown) for implementing functions of the SAE system 102. In an embodiment, the module 210 can be an Integrated Circuit (IC), external to the memory 204 (not shown), implemented using a Field-Programmable Gate Array (FPGA) or an Application-Specific Integrated Circuit (ASIC). The names of the modules of functional block in the modules 210 referred herein, are used for explanation and are not a limitation. Further, the memory 204 can also include a repository 112.

The hardware processor(s) 202 may be implemented as one or more multicore processors, a microprocessors, microcomputers, microcontrollers, digital signal processors, central processing units, state machines, logic circuitries, and/or any devices that manipulate data based on operational instructions. Among other capabilities, the hardware processor 202 is configured to fetch and execute computer-readable instructions stored in the memory 204 and communicate with the modules 210, internal or external to the memory 204, for triggering execution of functions to be implemented by the modules 210. The SAE 212 is configured for two stages, the training phase and the testing phase, for solving the regression problem. For example, the regression problem defined can be estimating axis load and spindle load of the CNC machines (units 110-1 through 110-n) based on inputs from the sensors sets 114-1 through 114-n through data sources 106-1 through 106-n. The training phase comprises generating the regression model for the SAE 212 for solving the regression problem. In an embodiment, the SAE 212 is the asymmetric SAE with the plurality of encoder layers and the single decoder layer. The example architecture of the asymmetric SAE (SAE 212) for regression is depicted in FIG. 2b. The example SAE 212 for regression comprises the asymmetric SAE having two encoding layers and a single decoder layer. Non-linearity is added at each layer using a non-linear activation function. The SAE 212 depicts representations of the raw input X (a set of input variables) at its encoding layers ($Z_1$ and $Z_2$) associated with a plurality of (for example herein, two) encoder weight matrices $W_{E_1}$ and $W_{E_2}$ respectively. The SAE system 102 is scalable with respect to number of encoding layers that can be included. Though the implementation, explained in example herein, has been done for two encoding layers, the regression model generated can be easily extrapolated to any number of encoding layers, suited to application. The resulting optimization problem can be solved in a similar manner to obtain multiple encoding weights. Also, the parameters and hyper-parameters are configurable and can be tuned as per the application. This makes the SAE system 102 adaptable and efficient.

The single decoding layer, associated with the decoder weight matrix $W_D$ strives to yield raw data from the representation at the deepest encoding layer. In addition to the encoding-decoding paradigm, the estimated or regressed target value y (output variable) is obtained from the representation at deepest layer ($Z_2$) of the SAE 212, associated with a weight vector w (alternatively referred as the regression weight vector).

The regression model for the SAE 212 is formulated as the non-convex joint optimization function (alternatively referred as joint optimization). The joint optimization function comprises the regression weight vector (w in the FIG. 2b) associated with the set of output variables for training (for example, as depicted in the FIG. 2b with only one output variable y) of the SAE 212, as well with the two encoder weight matrices ($W_{E_1}$ and $W_{E_2}$ in the FIG. 2b) associated with the plurality of encoder layers of the SAE 212 and the decoder weight matrix ($W_D$ in the figure) associated with the decoder layer of the SAE 212. The joint optimization function also comprises a set of training values associated with a set of input variables ($X=\{x_1, x_2, \ldots, x_n\}$) applied at an input encoder layer among a plurality of encoder layers of the SAE 212, a set of training values of the set of output variables ($y=\{y_1, y_2, \ldots, y_n\}$). Sensor data from each CNC machine unit, collected through data sources 106-1 through 106-n are used to train the SAE system 102 independently and separate training models are obtained corresponding to each CNC machine unit. It can be understood by person skilled in the art that there can be multiple SAEs, each trained for one unit, however all SAEs for all units are not shown in the FIG. 2a for simplicity. The explanation herein explains the SAE with respect to one SAE 212 for one unit, for example unit 110-1. While training each such SAE the SAE system 102 is provided with multiple such sets of the input variables ($x_1, x_2, \ldots, x_n$) and corresponding multiple output variables ($y_1, y_2, \ldots y_n$), as ground truth, and subsequently multiple estimated output values for multiple input sets are obtained, during which the weights associated with the SAE system are learnt. This means the input variable $x_1=\{x_{11}, x_{12}, \ldots, x_{1m}\}$ ($x_{11}, x_{12}, \ldots, x_{1m}$ are the descriptors for the input $x_1$) corresponds to the output variable with target value $y_1$. For multiple such input sets $x_1, x_2, \ldots, x_n$, corresponding output values $y_1, y_2, \ldots, y_n$ are provided during training. Here, 'm' is the number of descriptors of a single input (say $x_1$) at one time instance, where there are 'n' number of such input instances collected at different time instances. The proposed joint optimization function used during the training phase of the SAE 212 to learn weights is provided in equation 1 below, also explained in conjunction with step 302 of FIG.3.

$$\underset{W_{E_1}, W_{E_2}, W_D, w}{\operatorname{argmin}} \left( \begin{array}{c} \|(X - W_D\varphi(W_{E_2}\varphi(W_{E_1}X)))\|_F^2 + \\ \lambda \|y - w^T\varphi(W_{E_2}\varphi(W_{E_1}X))\|_F^2 \end{array} \right) \quad (1)$$

Where, $\lambda$ is a parameter for controlling the weightage of the regression term, $\|y-w^T\varphi(W_{E_2}\varphi(W_{E_1}X))\|$, in the non-convex joint optimization function of equation 1 and $\varphi$ is the non-linear activation function.

Further, the joint optimization function of the equation 1 is minimized to learn the regression weight vector (w), the plurality of encoder weight matrices ($W_{E_1}$ and $W_{E_2}$) associated with the plurality of encoder layers and the decoder weight matrix ($W_D$). The non-convex joint optimization function has multiple local minima with multiple locally optimal points and hence, it is difficult to solve. Thus, the proposed SAE 212 is configured to solve this non-convex problem by reformulating it as the Augmented Lagrangian formulation and splitting down into the sub-problems, also explained in conjunction with step 304 of FIG. 3. The advantage of the proposed method lies in the fact that the non-convex joint optimization function enables joint learning of the regression weights along with the encoding weight matrices and the decoding weight matrix. This ensures a more optimal solution owing to the fact that in the traditional pre-training approach the shallower layers influence the deeper layers but the opposite influence does not take place, which results in sub-optimality. When they are jointly learnt, all the layers influence one another. Moreover, since existing backpropagation technique is used for training unidirectional structures with one input and one output, they cannot be easily applied to the SAE architecture proposed, which has two outputs. Hence, the regression problem for the SAE 212 is addressed by formulating and solving the joint optimization problem. The minimization of the joint optimization function comprises reformulating the Augmented Lagrangian formulation (reformulated joint optimization function), as in equation 3, in terms of the plurality of proxy variables ($Z_1$ and $Z_2$) provided in equation 2 and a plurality of hyper parameters $\mu_1$ and $\mu_2$ provided in the Augmented Lagrangian formulation in the equation 3 below:

$$Z_2 = \varphi(W_{E_2}\varphi(W_{E_1}X)) \text{ and } Z_1 = \varphi(W_{E_1}X) \quad (2)$$

$$\underset{W_{E_1}, W_{E_2}, W_D, w, Z_1, Z_2}{\operatorname{argmin}} \left( \begin{array}{c} \|X - W_D Z_2\|_F^2 + \lambda\|y - w^T Z_2\|_F^2 + \\ \mu_2\|Z_2 - \varphi(W_{E_2}Z_1)\|_F^2 + \mu_1\|Z_1 - \varphi(W_{E_1}X)\|_F^2 \end{array} \right) \quad (3)$$

where, $Z_1$ and $Z_2$, the proxy variables, provide representations of X at the two encoding layers.

Further, the minimization of the joint optimization function in the training phase comprises splitting the reformulated joint function of equation 3, also referred as the Augmented Lagrangian formulation, into a set of derived functions, alternatively referred as sub problems P1, P2, P3, P4, P5 and P6 of the non-convex joint optimization function, as provided in equations 4 through equations 9 below with I as the identity matrix. This is performed using an Alternating Direction Method of Multipliers (ADMM), also explained in conjunction with step 306 of FIG. 3

$$P1: W_D \leftarrow \underset{W_D}{\operatorname{argmin}}\|X - W_D Z_2\|_F^2 \quad (4)$$

-continued $$P2: w \leftarrow \underset{w}{\operatorname{argmin}} \|y - w^T Z_2\|_F^2 \quad (5)$$

$$P3: W_{E_1} \leftarrow \underset{W_{E_1}}{\operatorname{argmin}} \|Z_1 - \varphi(W_{E_1} X)\|_F^2 \Rightarrow \quad (6)$$

$$W_{E_1} \leftarrow \underset{W_{E_1}}{\operatorname{argmin}} \|\varphi^{-1} Z_1 - W_{E_1} X\|_F^2$$

$$P4: W_{E_2} \leftarrow \underset{W_{E_2}}{\operatorname{argmin}} \|Z_2 - \varphi(W_{E_2} Z_1)\|_F^2 \Rightarrow \quad (7)$$

$$W_{E_2} \leftarrow \underset{W_{E_2}}{\operatorname{argmin}} \|\varphi^{-1} Z_2 - W_{E_2} Z_1\|_F^2 \quad (8)$$

$$P5: Z_2 \leftarrow$$
$$\underset{Z_2}{\operatorname{argmin}}(\|X - W_D Z_2\|_F^2 + \lambda \|y - w^T Z_2\|_F^2 + \mu_2 \|Z_2 - \varphi(W_{E_2} Z_1)\|_F^2) \Rightarrow$$

$$\underset{Z_2}{\operatorname{argmin}} \left\| \begin{pmatrix} X \\ \sqrt{\lambda} y \\ \sqrt{\mu_2} \varphi(W_{E_2} Z_1) \end{pmatrix} - \begin{pmatrix} W_D \\ \sqrt{\lambda} w^T \\ \sqrt{\mu_2} I \end{pmatrix} Z_2 \right\|_F^2 \quad (9)$$

$$P6: Z_1 \leftarrow \underset{Z_1}{\operatorname{argmin}}(\mu_2 \|Z_2 - \varphi(W_{E_2} Z_1)\|_F^2 + \mu_1 \|Z_1 - \varphi(W_{E_1} X)\|_F^2) \Rightarrow$$

$$\underset{Z_1}{\operatorname{argmin}} \left\| \begin{pmatrix} \sqrt{\mu_2} \varphi^{-1}(Z_2) \\ \sqrt{\mu_1} \varphi(W_{E_1} X) \end{pmatrix} - \begin{pmatrix} \sqrt{\mu_2} W_{E_2} \\ \sqrt{\mu_1} I \end{pmatrix} Z_1 \right\|_F^2$$

Furthermore, the minimization of the joint optimization function comprises obtaining argument minimum of each derived functions, during which the values of the plurality of encoder weight matrices, the decoder weight matrix, and the regression weight vector that minimizes the objective functions are learned also described in conjunction with step 308 of FIG. 3, to train the SAE for the regression problem. P1, P2 and P5 are standard linear least square problems having closed form solutions. They can also be solved using conjugate gradient. P3, P4 and P6 can be easily converted to their equivalent forms since the activation functions are unitary and easily invertible. Hence, P3, P4 and P6 turn out to be linear least square problems. This concludes the training phase of the SAE 212.

Upon training the SAE 212 by generating the regression model, the testing phase of the SAE comprises applying a set of test values associated with the set of input variables ($X_{test}$) to an output SAE function (as provided in equation 10 below) to estimate a set of values of the set of unknown output variables $\tilde{y}$. The output SAE function for the testing phase comprises the learned values of the plurality of encoder weights and the set of regression weights.

In an embodiment, the set of test values may be the values of input variables acquired in real time.

In an embodiment, the test values may be values of input variable acquired earlier for off line processing. The equation 10 below, used in testing phase, is used for both real time and off line scenarios.

$$\tilde{y} = w^T \varphi(W_{E_2} \varphi(W_{E_1} X_{test})) \quad (10)$$

The I/O interface(s) 206 in the SAE system 102 may include a variety of software and hardware interfaces, for example, a web interface, a graphical user interface and the like. The interface(s) 206 may include a variety of software and hardware interfaces, for example, interfaces for peripheral device(s), such as a keyboard, a mouse, an external memory, sensors (data sources 106-1 through 106-n), and a printer and a display. The interface(s) 206 may enable the SAE system 102 to communicate with other devices, such as the computing device 104, web servers and external databases (such as the repository 112, if external to the SAE system 102). The interface(s) 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 206 may include one or more ports for connecting a number of computing systems with one another or to another server computer. The I/O interface(s) 206 may include one or more ports for connecting a number of devices to one another or to another server. The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the modules 210 may include routines, programs, objects, components, data structures, and so on, which perform particular tasks or implement particular abstract data types. The modules 210 may include computer-readable instructions that supplement applications or functions performed by the SAE system 102. The repository 112 may store data that is processed, received, or generated as a result of the execution of one or more modules in the module(s) 210.

Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

FIG. 3 is a flow diagram illustrating a method 300 for incorporating regression into the SAE 212 for solving the regression problem, in accordance with some embodiments of the present disclosure. The method 300 includes two stages for the SAE 212, the training stage and the testing stage In an embodiment, at step 302, the method 300 includes allowing the SAE system 102 to generate the regression model for the SAE 212 for solving the regression problem. The regression model is formulated as the non-convex joint optimization function (as provided in equation 1) and comprises the set of training values associated with the set of input variables $X = \{x_1, x_2, \ldots, x_n\}$ applied at the input encoder layer. The input encoder layer is a first layer among the plurality of encoder layers of the SAE 212 that receives external input. The joint optimization function also comprises the set of training values for the set of output variables $y_1, y_2, \ldots, y_n$, the plurality of encoder weights matrices $W_{E_1}$ and $W_{E_2}$ associated with the plurality of encoder layers, the decoder weight matrix $W_D$ associated with the decoder layer of the SAE 212, the regression weight vector (w) associated with the set of output variables, the parameter $\lambda$ for controlling weightage of the regression term and the nonlinear activation function $\varphi$.

At step 304, the method 300 includes allowing the SAE system 102 to reformulate the non-convex joint optimization function in terms of the plurality of proxy variables ($Z_1$ and $Z_2$ as provided in equation 2) and the plurality of hyper parameters ($\mu_1$ and $\mu_2$ provided in Augmented Lagrangian formulation in the equation 3). The plurality of proxy variables provide representations of the set of input variables at each encoder layer among the plurality of encoder layers of the SAE 212.

At step 306, the method 300 includes allowing the SAE system 102 to split the Augmented Lagrangian formulation (alternatively referred as reformulated joint optimization function) into the set of derived functions (as provided in equations 4, 5, 6, 7, 8 and 9) using the ADMM. The derived functions are the sub-problems of the Augmented Lagrangian formulation.

At step 308, the method includes allowing the SAE system 102 to learn values of the plurality of encoder weight matrices, the decoder weight matrix, the regression weight vector and values of the plurality of proxy variables for the regression model to train the SAE for the regression problem. The values are learnt by obtaining argument minimum of each derived function among the set of derived functions in multiple iterations. This concludes the training phase for the SAE 212. The step 308 works in iterations during the training phase where an error is computed after each iteration and subsequent iterations try to minimize the error. The training can be stopped at any iteration to check whether error approximately decreases as a whole and thus training failures can be detected. If not, the number of encoding layers, number of iterations and values of the parameter and hyper-parameters can be changed as per the application scenario and error reduction can be checked during training. This makes the method 300 and the SAE system 102 traceable while being adaptable to any scenario. Thus, the method proposed is adaptable and efficient because it can be applied to any regression problem with minimal changes and the SAE architecture provides flexibility in terms of changing the number of encoding layers, configuring parameters and the like.

Upon completion of the training phase, at step 310, the method 300 includes allowing the SAE system 102 to apply the set of test values associated with the set of input variables the output SAE function (as provided in equation 10) of the SAE 212 to obtain the set of test values for the unknown output variables. The output variables are unknown.

In an embodiment, the set of test values may be the values of input variables acquired in real time.

In an embodiment, the test values may values of input variable acquired earlier for off line processing.

The output SAE function comprises the derived values (also referred as learned weights) of the plurality of encoder weight matrices and the regression weight vector. The learned weights have small sizes or values, this enables the testing phase to be performed both in real time as well as offline, as per the need.

Implementation of the method 300 in a small factory environment deployed with 2 axis Horizontal and 4 axis Vertical CNC Turning machine (for example, unit 110-1 or 110-2) is provided. The SAE 212, trained for the defined regression problem for the CNC machine, in the example herein, receives input data from different sensor signals (for example sensors 114-1 or data sources 106-1 monitoring the unit 110-1) associated with the CNC machine. The axial load and spindle load, incurred while machining specific components, measured in units of mega-watt (Mw), is recorded as ground truth for training using the method 300. During the testing phase, the ground truth is kept unknown to the regression model and these unknown values are estimated using the generated regression model. For measuring the performance or evaluating the SAE system 102 of the regression model, the hidden ground truth for the test data is compared with the estimated ones and error values are computed. In the practical SAE system 102, the output values for test data remain unknown, hence they are kept hidden from the regression model. Data samples collected per second throughout a day over a period of 1 month during the actual operating condition of the CNC machine. The captured signals consist of absolute tool position across all the axes, amount of distance to go along the controlled axes, spindle speed value related to constant surface speed control on CNC, surface speed value, feed rate and the spindle motor speed. Further, the estimation of load values at different axes as well as the spindle load is carried out using steps of the method 300 with these captured signals as input variable values (X). Table 1 below provides parameter values of $\lambda$ and $\mu_1$ and $\mu_2$ considered for a generated regression model for the load estimation on the CNC machine during the training phase in accordance with the steps of the method 300 based on equations 1 through 9.

TABLE 1

| Axes names | $\lambda$ | $\mu_1$ | $\mu_2$ |
|---|---|---|---|
| Axis1 | 1.6 | 1.3 | 1.3 |
| Axis2 | 0.5 | 1.7 | 1.7 |
| Axis3 | 0.6 | 1.6 | 1.6 |
| Axis4 | 1.1 | 1.5 | 1.5 |
| Spindle | 0.7 | 1.6 | 1.6 |

A non-linearity at each layer of the regression model is added using the hyperbolic tangent function. Number of nodes at hidden layers of the SAE are adjusted experimentally. Table 2 below presents the results obtained across 3 exemplary days using the regression model proposed.

TABLE 2

| Day | Axis | Perf. metrics | Linear Regression | LASSO Regression | SVR-Polynomial | SVR-Gaussian | Traditional SAE | Regression using model proposed |
|---|---|---|---|---|---|---|---|---|
| 4-Apr | Axis3 | NMSE | 0.1208 | 0.1231 | 0.1307 | 0.1308 | 0.1204 | 0.1162 |
| | | RMSE | 5.0349 | 5.1313 | 7.0871 | 7.0864 | 5.0163 | 4.8417 |
| 4-Apr | Axis4 | NMSE | 0.8018 | 0.8026 | 0.9593 | 0.9717 | 0.98 | 0.6579 |
| | | RMSE | 4.9956 | 5.0007 | 6.188 | 6.1863 | 6.1061 | 4.0995 |
| 4-Apr | Spindle | NMSE | 0.9406 | 0.9421 | 0.9955 | 0.9965 | 0.9745 | 0.8891 |
| | | RMSE | 6.6704 | 6.681 | 7.0711 | 7.0722 | 6.9114 | 6.3053 |
| 7-Apr | Axis1 | NMSE | 0.6343 | 0.6353 | 0.6841 | 0.6852 | 0.7132 | 0.5842 |
| | | RMSE | 5.1879 | 5.1959 | 6.1761 | 6.1635 | 5.8331 | 4.4397 |
| 7-Apr | Axis3 | NMSE | 0.1039 | 0.1042 | 0.1132 | 0.1147 | 0.1002 | 0.098 |
| | | RMSE | 4.3305 | 4.3438 | 6.3841 | 6.3579 | 4.1767 | 4.0834 |

TABLE 2-continued

| Day | Axis | Perf. metrics | Linear Regression | LASSO Regression | SVR-Polynomial | SVR-Gaussian | Traditional SAE | Regression using model proposed |
|---|---|---|---|---|---|---|---|---|
| 7-Apr | Spindle | NMSE | 0.8675 | 0.8806 | 0.9978 | 0.999 | 0.9809 | 0.8141 |
| | | RMSE | 7.1641 | 7.2726 | 8.2515 | 8.2523 | 8.101 | 6.7231 |
| 12-Apr | Axis2 | NMSE | 0.6434 | 0.6477 | 0.7850 | 0.7857 | 0.5945 | 0.5587 |
| | | RMSE | 7.7262 | 7.7779 | 9.7801 | 9.7791 | 7.1389 | 6.7093 |
| 12-Apr | Axis3 | NMSE | 0.1082 | 0.1082 | 0.1168 | 0.1185 | 0.1026 | 0.1001 |
| | | RMSE | 4.4554 | 4.4554 | 6.0906 | 6.0639 | 4.2260 | 4.1199 |
| 12-Apr | Axis4 | NMSE | 0.7401 | 0.7591 | 0.9601 | 0.9806 | 0.9862 | 0.5372 |
| | | RMSE | 4.8051 | 4.9286 | 6.4675 | 6.4629 | 6.4030 | 3.4877 |

Performance metrics such as Normalized Mean Square Error (NMSE) provided in equation 11 and the Root Mean Square Error (RMSE) provided in equation 12 below are used as they are widely used for making comparisons in the manufacturing domain regression techniques.

$$NMSE = \frac{\|y - \tilde{y}\|_2}{\|y\|_2} \quad (11)$$

$$RMSE = \sqrt{\frac{\sum_{m=1}^{N}(y_m - \tilde{y}_m)^2}{N}} \quad (12)$$

Where, y(output variable) is the vector of actual load values measured from the axes, $\tilde{y}$ is the estimated load vector using regression analysis and N=length(y). Based on the recordings in the Table 2 the proposed method providing SAE based regression shows consistent improvement in performance in terms of both the metrics over the traditional regression techniques such as Least Absolute Shrinkage and Selection Operator (LASSO), Support Vector Regression (SVR) and the like.

The illustrated steps of method 300 are set out to explain the exemplary embodiments shown, and it should be anticipated that ongoing technological development may change the manner in which particular functions are performed. These examples are presented herein for purposes of illustration, and not limitation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for incorporating regression into a Stacked Auto Encoder (SAE), the method comprising:

generating a regression model for the SAE for solving a regression problem by formulating the regression model as a non-convex joint optimization function, wherein the non-convex joint optimization function comprises a first set of training values associated with a set of input variables applied at an input encoder layer among a plurality of encoder layers of the SAE, a second set of training values for a set of output variables, a plurality of encoder weight matrices associated with the plurality of encoder layers, a decoder weight matrix associated with a decoder layer of the SAE, a regression weight vector associated with the set of output variables, a parameter for controlling weightage of a regression term of the non-convex joint optimization function and a non-linear activation function, wherein the non-convex joint optimization function incorporates the regression and modifies a Euclidean cost function of a SAE framework, wherein the modifications to the Euclidean cost function include reducing number of decoder layers to a single decoder layer which represents an asymmetric SAE and wherein incorporating the set of output variables and the regression weight vector to the Euclidean cost function enables joint learning, and wherein weights of the plurality of encoder weight matrices, the decoder weight matrix and the regression weight vector associated with the output variables are learned simultaneously and wherein the asymmetric SAE enables a robust abstraction capacity of deep learning without over-fitting;

reformulating the non-convex joint optimization function as an Augmented Lagrangian formulation in terms of a plurality of proxy variables and a plurality of hyper parameters, wherein the plurality of proxy variables provide representations of the set of input variables at each encoder layer among the plurality of encoder layers of the SAE, wherein the non-convex joint optimization function representing the regression model is minimized to learn values of the regression weight vector, values of the plurality of encoder weight matrices and values of the decoder weight matrix;

splitting the Augmented Lagrangian formulation into a set of derived functions using Alternating Direction Method of Multipliers (ADMM), wherein the derived functions are sub-problems of the Augmented Lagrangian formulation;

learning values of the plurality of encoder weight matrices, the decoder weight matrix, the regression weight vector and the plurality of proxy variables for the regression model to train the SAE for the regression problem by obtaining argument minimum of each derived function among the set of derived functions in multiple iterations, wherein the values of the plurality of encoder weight matrices, the decoder weight matrix and the regression weight vector associated with the output variables are learnt jointly, wherein an error is computed after each iteration of the multiple iterations and stopping training of the SAE at a specific iteration of the multiple iterations to check whether the error is decreased to a specific value and thereby detecting training failures;

changing number of encoding layers, number of iterations and values of one or more parameters, values of the plurality of hyper-parameters as per an application scenario if the error is not decreased to the specific value and thereby checking error reduction during the training, wherein the SAE is scalable with respect to the number of encoding layers to be included, and , wherein the one or more parameters and the plurality of hyper-parameters are configurable and tuned as per the application;

and applying a set of test values associated with the set of input variables to an output SAE function of the SAE to estimate a set of values for the set of output variables, wherein the set of output variables are unknown, wherein the output SAE function comprises the learned values of the plurality of encoder weight matrices and the regression weight vector, wherein the learned values comprises of small sizes and enable a testing phase to perform in at least one of a real time and offline.

2. The method of claim 1, wherein the SAE is trained by generating the regression model, and wherein the trained SAE is the asymmetric SAE.

3. A Stacked Auto Encoder (SAE) system (102) for incorporating regression into a Stacked Auto Encoder (SAE) (212), the SAE system (102) comprising:

a processor (202);

an Input Output (I/O) interface (206);

a memory (204), the memory comprising the SAE (212); and a repository (112);

wherein, the processor (202) is configured to:

generate a regression model for the SAE (212) for solving a regression problem by formulating the regression model as a non-convex joint optimization function, wherein the non-convex joint optimization function comprises a first set of training values associated with a set of input variables applied at an input encoder layer among a plurality of encoder layers of the SAE (212), a second set of training values for a set of output variables, a plurality of encoder weight matrices associated with the plurality of encoder layers, a decoder weight matrix associated with a decoder layer of the SAE (212), a regression weight vector associated with the set of output variables, a parameter for controlling weightage of a regression term of the non-convex joint optimization function and a non-linear activation function, wherein the non-convex joint optimization function incorporates the regression and modifies a Euclidean cost function of a SAE framework, wherein the modifications to the Euclidean cost function include reducing number of decoder layers to a single decoder layer which represents an asymmetric SAE and wherein incorporating the set of output variables and the regression weight vector to the Euclidean cost function enables joint learning, and wherein weights of the plurality of encoder weight matrices, the decoder weight matrix and the regression weight vector associated with the output variables are learned simultaneously and wherein the asymmetric SAE enables a robust abstraction capacity of deep learning without over-fitting;

reformulate the non-convex joint optimization function as an Augmented Lagrangian formulation in terms of a plurality of proxy variables and a plurality of hyper parameters, wherein the plurality of proxy variables provide representations of the set of input variables at each encoder layer among the plurality of encoder layers of the SAE (212), wherein the non-convex joint optimization function representing the regression model is minimized to learn values of the regression weight vector, values of the plurality of encoder weight matrices and values of the decoder weight matrix;

split the Augmented Lagrangian formulation into a set of derived functions using Alternating Direction Method of Multipliers (ADMM), wherein the derived functions are sub-problems of the Augmented Lagrangian formulation;

learn values of the plurality of encoder weight matrices, the decoder weight matrix, the regression weight vector and the plurality of proxy variables for the regression model to train the SAE (212) for the regression problem by obtaining argument minimum of each derived function among the set of derived functions in multiple iterations, wherein the values of the plurality of encoder weight matrices, the decoder weight matrix and the regression weight vector associated with the output variables are learnt jointly, wherein an error is computed after each iteration of the multiple iterations and stopping training of the SAE at a specific iteration of the multiple iterations to check whether the error is decreased to a specific value and thereby detecting training failures;

change number of encoding layers, number of iterations and values of one or more parameters, values of the plurality of hyper-parameters as per an application scenario if the error is not decreased to the specific value and thereby checking error reduction during the training, wherein the SAE is scalable with respect to the number of encoding layers to be included, and , wherein the one or more parameters and the plurality of hyper-parameters are configurable and tuned as per the application; and apply a set of test values associated with the set of input variables to an output SAE function of the SAE (212) to estimate a set of values for the output variables, wherein the output variables are unknown, wherein the output SAE function comprises the learned values of the plurality of encoder weight matrices and the regression weight vector, wherein the learned values comprises of small sizes and enable a testing phase to perform in at least one of a real time and offline.

4. The SAE system (102) of claim 3, wherein the SAE (212) is trained by generating the regression model, wherein the trained SAE is the asymmetric SAE.

5. One or more non-transitory machine readable information storage mediums comprising one or more instructions which when executed by one or more hardware processors causes the one or more hardware processor to perform a method for incorporating regression into a Stacked Auto Encoder (SAE), said method comprising:

generating a regression model for the SAE for solving a regression problem by formulating the regression model as a non-convex joint optimization function, wherein the non-convex joint optimization function comprises a first set of training values associated with a set of input variables applied at an input encoder layer among a plurality of encoder layers of the SAE, a second set of training values for a set of output variables, a plurality of encoder weight matrices associated with the plurality of encoder layers, a decoder weight matrix associated with a decoder layer of the SAE, a regression weight vector associated with the set of output variables, a parameter for controlling weightage of a regression term of the non-convex joint optimization function and a non-linear activation function, wherein the non-convex joint optimization function incorporates the regression and modifies a Euclidean cost function of a SAE framework, wherein the modifications to the Euclidean cost function include reducing number of decoder layers to a single decoder layer which represents an asymmetric SAE and wherein incorporating the set of output variables and the regression weight vector to the Euclidean cost function enables joint learning, and wherein weights of the plurality of encoder weight matrices, the decoder weight matrix and the regression weight vector associated with the output variables are learned simultaneously and wherein the asymmetric SAE enables a robust abstraction capacity of deep learning without over-fitting;

reformulating the non-convex joint optimization function as an Augmented Lagrangian formulation in terms of a plurality of proxy variables and a plurality of hyper parameters, wherein the plurality of proxy variables provide representations of the set of input variables at each encoder layer among the plurality of encoder layers of the SAE, wherein the non-convex joint optimization function representing the regression model is minimized to learn values of the regression weight vector, values of the plurality of encoder weight matrices and values of the decoder weight matrix;

splitting the Augmented Lagrangian formulation into a set of derived functions using Alternating Direction Method of Multipliers (ADMM), wherein the derived functions are sub-problems of the Augmented Lagrangian formulation; and learning values of the plurality of encoder weight matrices, the decoder weight matrix, the regression weight vector and the plurality of proxy variables for the regression model to train the SAE for the regression problem by obtaining argument minimum of each derived function among the set of derived functions in multiple iterations, wherein the values of the plurality of encoder weight matrices, the decoder weight matrix and the regression weight vector associated with the output variables are learnt jointly, wherein an error is computed after each iteration of the multiple iterations and stopping training of the SAE at a specific iteration of the multiple iterations to check whether the error is decreased to a specific value and thereby detecting training failures;

changing number of encoding layers, number of iterations and values of one or more parameters, values of the plurality of hyper-parameters as per an application scenario if the error is not decreased to the specific value and thereby checking error reduction during the training, wherein the SAE is scalable with respect to the number of encoding layers to be included, and , wherein the one or more parameters and the plurality of hyper-parameters are configurable and tuned as per the application; and applying a set of test values associated with the set of input variables to an output SAE function of the SAE to estimate a set of values for the set of output variables, wherein the set of output variables are unknown, wherein the output SAE function comprises the learned values of the plurality of encoder weight matrices and the regression weight vector, wherein the learned values comprises of small sizes and enable a testing phase to perform in at least one of real time and offline.

6. The one or more non-transitory machine readable information storage mediums of claim 5, wherein the SAE is trained by generating the regression model, and wherein the trained SAE is the asymmetric SAE.

* * * * *